United States Patent
Wilson (10) Patent No.: US 11,820,183 B1
(45) Date of Patent: Nov. 21, 2023

(54) MARSH BUGGY IN COMBINATION WITH A SKID STEER

(71) Applicant: Paul K. Wilson, Marrero, LA (US)

(72) Inventor: Paul K. Wilson, Marrero, LA (US)

( * ) Notice: Subject to any disclaimer, the term of this patent is extended or adjusted under 35 U.S.C. 154(b) by 1209 days.

(21) Appl. No.: 16/428,499

(22) Filed: May 31, 2019

Related U.S. Application Data (60) Provisional application No. 62/679,447, filed on Jun. 1, 2018.

(51) Int. Cl.
*B60F 3/00* (2006.01)
*E02F 3/96* (2006.01)
(Continued)

(52) U.S. Cl.
CPC .......... *B60F 3/0015* (2013.01); *A01D 34/835* (2013.01); *B60F 3/0038* (2013.01); *B60F 3/0061* (2013.01); *E02F 3/3414* (2013.01); *E02F 3/422* (2013.01); *E02F 3/96* (2013.01); *E02F 9/02* (2013.01); *E02F 9/2004* (2013.01)

(58) Field of Classification Search
CPC .... B60F 3/0015; B60F 3/0061; B60F 3/0038; A01D 34/835; E02F 3/3414; E02F 3/422; E02F 3/96; E02F 3/02; E02F 3/2004
See application file for complete search history.

(56) References Cited

U.S. PATENT DOCUMENTS

4,433,634 A * 2/1984 Coast ............... B60F 3/0061
                                                  180/9.1
5,379,709 A * 1/1995 Wilkerson ............ B62D 55/06
                                                  440/12.64
(Continued)

*Primary Examiner* — Abigail A Risic
(74) *Attorney, Agent, or Firm* — Jones Walker LLP (57) ABSTRACT

A combination of a marsh buggy is coupled with a modified skid steer. The skid steer has a frame, and hydraulic lines for attaching to hydraulic driven motors for driving a track or wheeled drive system. The skid steer further having an engine and a hydraulic system, including a pump and hydraulic tank, and valves; an operator's cab positioned on the frame, said operator's cab further comprising a set of hydraulic controls connectable to the hydraulic system for controlling the drive system and a hydraulically driven lift system, including two booms, each boom comprising a first arm and a second arm, the first arm being pivotably mounted to the frame, the second arm being telescopically coupled to the first arm by a hydraulic cylinder controllable from the operator's cab. The marsh buggy includes a first and a second floatable pontoons, the two pontoons coupled together in a parallel but offset relationship. Each pontoon has an endless track including a chain and treads coupled around the periphery of each respective pontoon, and a series of sprockets coupled to the chain on each pontoon; each sprocket connected to a hydraulic motor. The marsh buggy further has hydraulic motors and drive sprockets coupled to the hydraulic system for driving the endless track. The skid steer is mounted on the marsh buggy, between the two pontoons, and the hydraulic motors of the marsh buggy are operationally coupled to said hydraulic system of said skid steer so that said hydraulic controls in said cab are operationally connected to said hydraulic motors to control the drive system on the marsh buggy.

15 Claims, 7 Drawing Sheets

(51) Int. Cl.
*E02F 9/02* (2006.01)
*E02F 9/20* (2006.01)
*E02F 3/34* (2006.01)
*E02F 3/42* (2006.01)
*A01D 34/835* (2006.01)

(56) References Cited

U.S. PATENT DOCUMENTS

| | | | | |
|---|---|---|---|---|
| 6,315,622 | B1* | 11/2001 | Wilson, Sr. | B60F 3/003 |
| | | | | 440/12.5 |
| 6,918,801 | B2* | 7/2005 | Wilson, Jr. | B63B 35/38 |
| | | | | 440/12.63 |
| 7,588,106 | B2* | 9/2009 | Koskinen | E02F 9/024 |
| | | | | 440/12.63 |
| 7,849,942 | B2* | 12/2010 | Wilson | B60F 3/0038 |
| | | | | 180/9 |
| 10,259,281 | B2* | 4/2019 | Barani | B60F 3/0015 |
| 2005/0014425 | A1* | 1/2005 | Wilson | B60F 3/0015 |
| | | | | 440/12.63 |
| 2019/0001770 | A1* | 1/2019 | Barani | B62D 55/06 |
| 2021/0140140 | A1* | 5/2021 | Wilson, Sr. | E02F 9/2883 |
| 2022/0169086 | A1* | 6/2022 | Sundelin | B60F 3/0038 |

* cited by examiner

MARSH BUGGY IN COMBINATION WITH A SKID STEER

CROSS REFERENCE TO RELATED APPLICATION

This application claims the benefit under 35 USC § 119(e) of U.S. Provisional Application No. 62/679,447, filed Jun. 1, 2018, which is incorporated by reference herein in its entirety.

BACKGROUND

Figure 1:
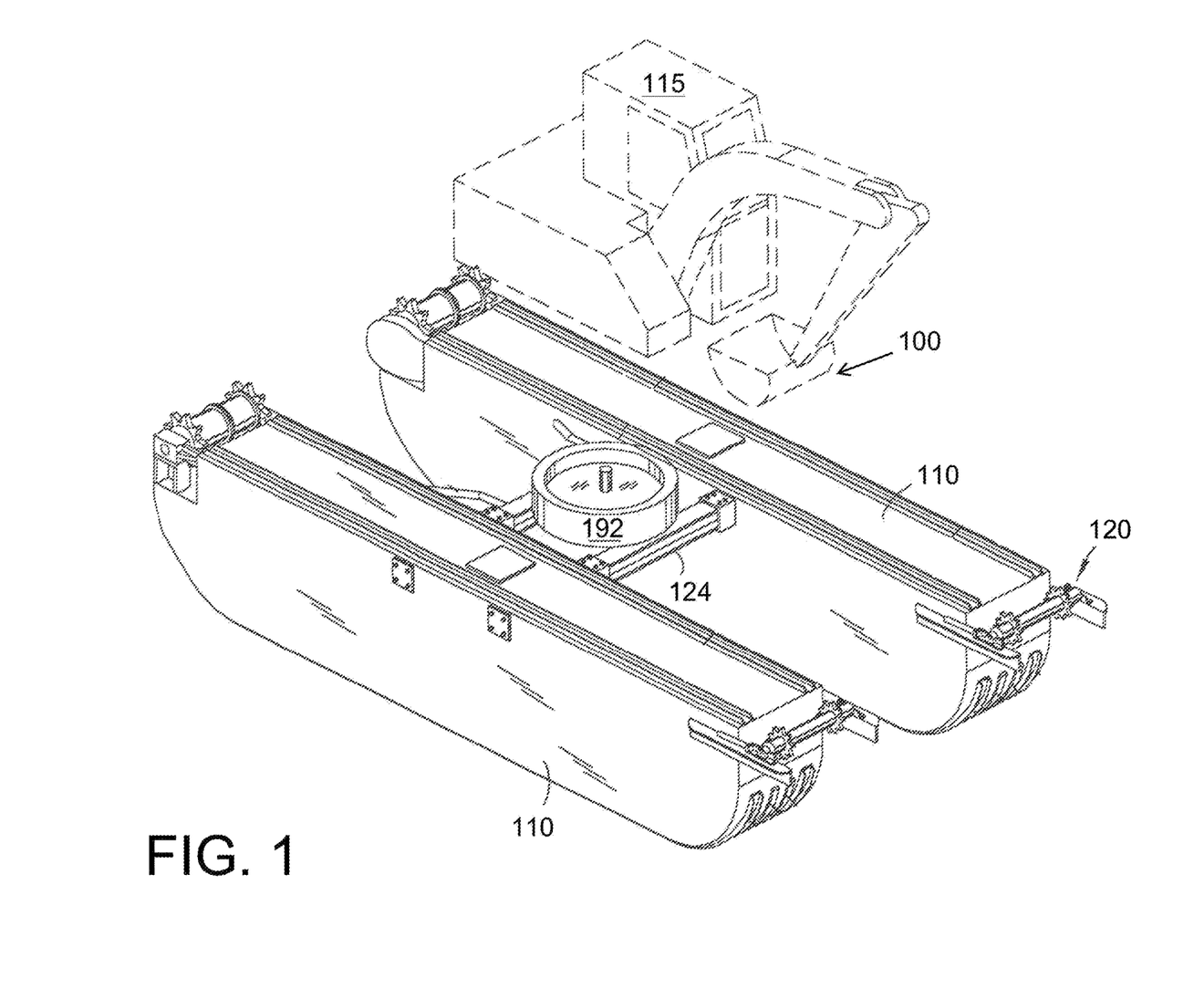
FIG. 1 is a perspective view of an embodiment of a prior art marsh buggy.
Figure 2:
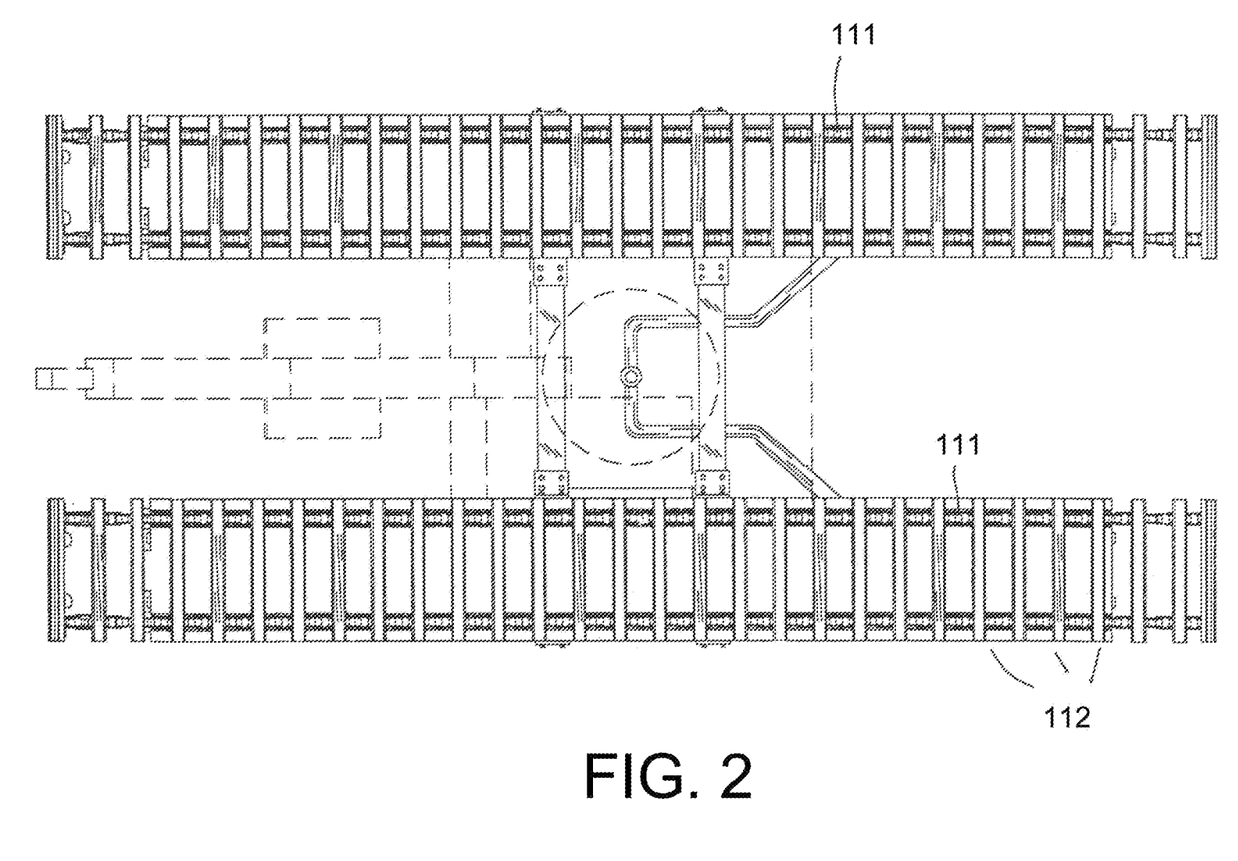
FIG. 2 is a bottom view of a marsh buggy of FIG. 1 showing features of the endless drive system.
Figures 3, 4:
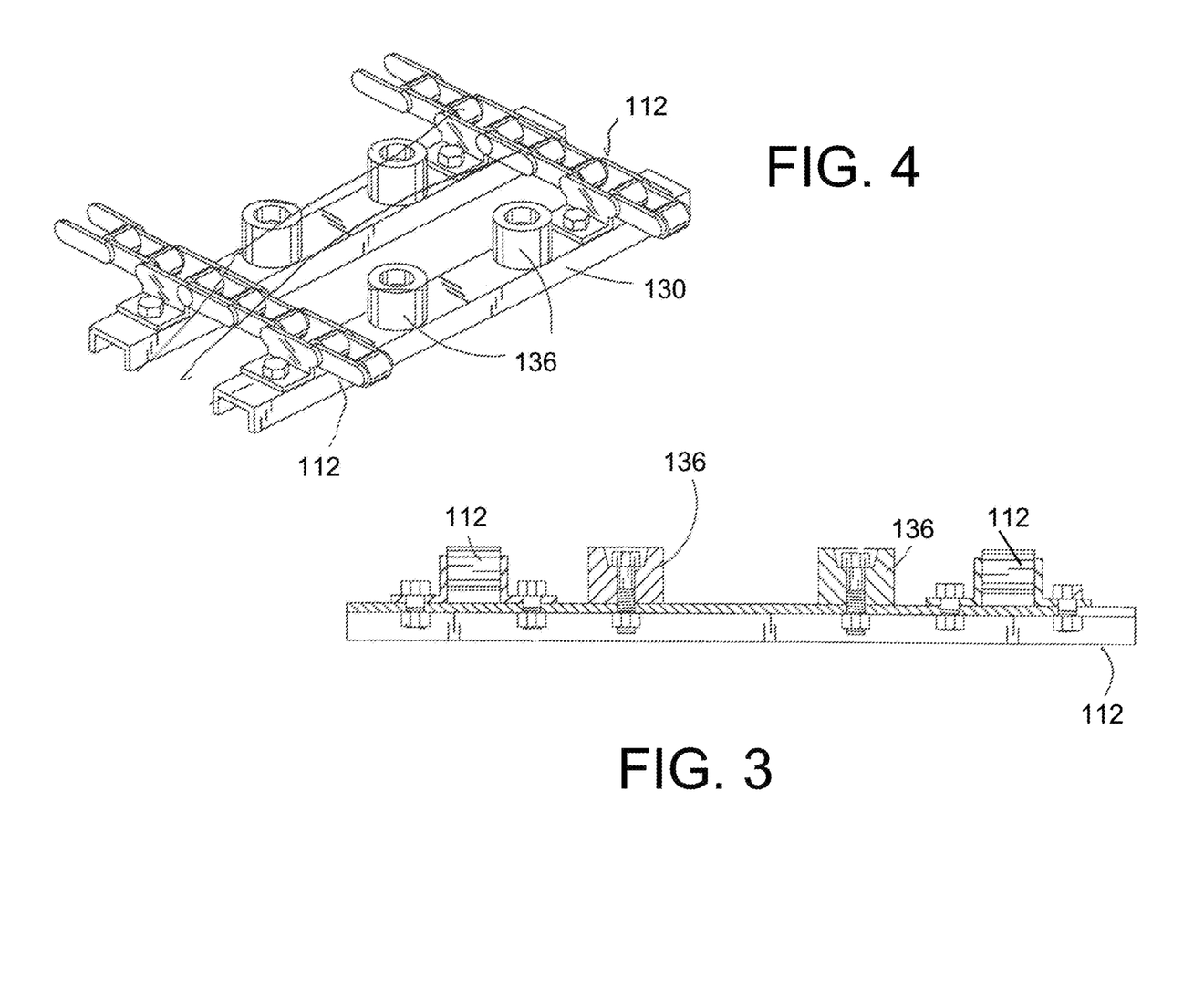
FIG. 3 is a cross section through the drive system of FIG. 2 showing one embodiment of a cleat.
FIG. 4 is a detail view of a portion of FIG. 3 showing details of the cleats.

Amphibious vehicles, often known as marsh buggies, were first developed to support oil and gas exploration operations conducted in marshy or swampy terrain. As suggested in FIG. 1, marsh buggies typically include a pair of pontoons 110 connected by a structure such as bridge beams 124 extending between the pontoons. The bridge beams support a center platform or a turntable 192, on which a cab 115 is positioned. See FIG. 1. The pontoons are usually surrounded by a cleated endless track system that is capable of engaging ground or swamp land to propel the vehicle. The track system uses one or more endless chains 111 surrounding the periphery of each pontoon. See FIG. 2. Coupled to the chains are tracks 112, and preferably cleats. See FIGS. 3 and 4. The endless chains, supporting the cleated tracks, are driven about the periphery of the pontoons by a sprocket system 120 or other means, which are in turn driven by a hydraulic motor (not shown), in order to provide propulsion to the vehicle. Generally, there are two sprocket systems per pontoon (a front and a rear). Hydraulics generally are used to control the action of each pontoon drive system, with the hydraulic controls mounted in a cab 115 mounted on the center platform (which be mounted on a turntable located on the platform, which can also be hydraulically controlled). By varying the track speed around each pontoon, the vehicle can be advanced, turned, or reversed. Various types of amphibious marsh crafts are known in the art.

One example is shown in U.S. Pat. No. 2,546,523 (incorporated by reference) which discloses a marsh buggy vehicle comprising a pair of spaced, elongated pontoons disposed and secured in a parallel offset relationship. Two endless chains pass about each pontoon periphery over sprockets 120 mounted transversally to the chain, where each sprocket is connected to a hydraulic motor in order to drive the treads. There are generally two motors per pontoon, one in the front and one in the rear. The chains are preferentially joined together transversely by slats which form the treads or tracks 112 for the craft. Another example is shown in U.S. Pat. No. 3,842,785 (incorporated by reference). This apparatus includes two pontoons, each with two endless drive chains carried in channels disposed on top and bottom of the pontoons. The cleats 136, if present, are preferably attached to the chains and have plastic blocks 130 which are secured to the web of the cleats and bear against the top and bottom of the pontoons. See FIG. 4. Other examples include U.S. Pat. Nos. 4,433,634; 3,656,449; 3,842,785; 3,902,448; 3,951,093; 4,070,978; 4,399,623; 4,658,751; 4,846,092; 5,311,682; 5,379,709; 5,511,508; 5,740,875; 5,791,074; 6,273,767; 6,315,622; 6,482,053; 6,315,622; 20050003715; 7,552,785; 7,670,200; 20100062664; 8,721,378; 9,162,545; 9,260,145; and 20160082798, all of which are incorporated by reference.

The two pontoons are connected together in a parallel but offset relationship. The connections can be by beams, a platform, or a cab itself interposed between the two and connected to each of the pontoons. Typically, the cab and associated hydraulic controls and attached tool are separately built and mounted on the platform.

Due to their cleated track system, marsh buggies are ideal for operation in wetlands, marshlands, and other low-lying areas. Moreover, many have been adapted to haul personnel and cargo as well as serve as the operating platform for various types of equipment, such as excavators, draglines, and backhoes. Typically, the top several inches of the ground in wetlands, marshlands, and other low-lying areas are mud or soft terrain that cannot support weight. However, in some cases, beneath the mud or soft terrain, there is more solid ground that can support a vehicle's weight. During operation of a marsh buggy, the cleated tracks surrounding each pontoon sink into the soft terrain, or mud, until the tracks contact the more solid ground beneath. Contact between the cleated tracks and the solid ground provides traction for the marsh buggy, allowing the marsh buggy to maneuver through the mud or soft terrain. In softer marsh areas, where solid ground is very deep, marsh buggies will still operate, with the pontoons providing the needed flotation and the cleats on the tracks operating much like the paddle wheel on a paddleboat, thereby propelling the vehicle.

Most conventional marsh buggies and amphibious vehicles are manufactured and sold as "turnkey" vehicles. In other words, such marsh buggies are each sold as one complete, integral vehicle including the pontoons, cleated tracks, drive train, chassis, engine, platform or cabin, etc. Consequently, such conventional marsh buggies tend to be relatively expensive and intended for a single purpose. For instance, for clearing land, a bush hog or mower can be employed as a tow-behind cutting implement on a marsh buggy. However, when towing a bush hog behind a marsh buggy, the treads of the buggy will crush the ground cover, making it difficult for the bush hog to cut. Further, a bush hog towed behind the marsh buggy can be difficult to maneuver around and cut close to obstacles such as fences and power line poles. A more adaptable marsh buggy is needed.

Figure 5:
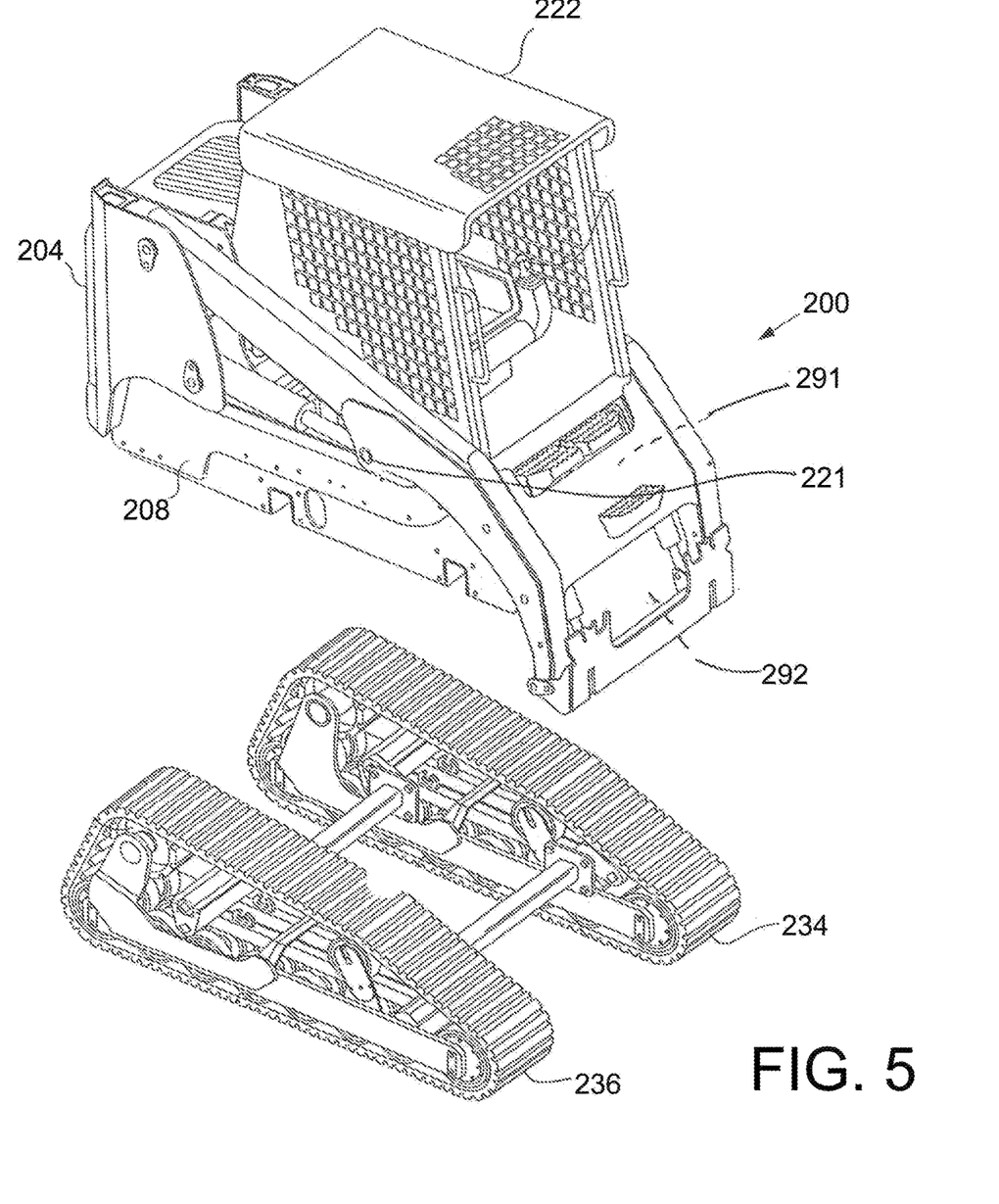
FIG. 5 is one embodiment of a prior art skid steer device.

One such adaptable machine, not suitable for marshy deployments, is commonly referred to as a skid loader, skid-steer loader, or skid steer 200, one example of which is seen in FIG. 5. These are small, rigid-frame, engine-powered machines with lift arms or booms 204 used to attach a wide variety of labor-saving tools or other attachments. Skid-steer vehicles generally have a frame or chassis 208 having a cab 222 mounted on the frame and housing the operator's seat and controls. See U.S. Pat. No. 4,074,782. The cab 222 is typically heated and air conditioned. The two lift arms or booms 204 are pivotally mounted to the frame 208, usually in a configuration where the lift arms are alongside the driver with the pivot points behind the driver's shoulders. See for instance, U.S. Pat. Nos. 7,156,200 and 6,397,967. Some cabs are completely removable, and some cabs pivot rearward, such as those used on the BOBCAT loader made by the Bobcat Company unit of Ingersoll-Rand Company. Cabs which pivot near the top and rear of the vehicle also have been advanced, such as that shown in U.S. Patent No. 5,941,330. Forward pivoting cabs on skid steer loaders have also been used, as shown in U.S. Pat. No. 5,551,826, where the entire lift arm control linkage moves with the cab, making it quite heavy for pivoting. Skid steer loaders are usually wheel driven or track driven, where the tracks or wheels are powered by hydraulic motors. See also 4,074,782; U.S. Patent Publication No. 20090183489; and U.S. Pat. No. 6,832,659 all incorporated by reference. The hydraulic system 291, including pumps, valves, and hydraulic fluid tank, are usually mounted on the chassis or frame, as is the diesel or gas powered engine 292. Details of typical skid steer—like vehicles are included in U.S. Pat. Nos. 6,397,967; 3,797,211; 3,850,473; 4,074,782; D294,032; 5,303,792; and 5,730,239; all of which are incorporated by reference.

The arms of the skid steer terminate in couplers designed to couple and lock to tools or adapters designed to work with the skid steer, such as mowers, augers, loaders, and other implements. Hydraulic hoses extend down the arms of the skid steer to couple with attached tools to allow the operator to control the tool's operation. Many prior art skid-steer lift arm systems are designed using a hinge 221 at the rear of the machine in order to pivot the lift arms up into the air in an arc that swings up over the top of the operator. This design tends to limit the usable height to how long the lift arm is and the height of that pivot point. In the raised position, the front of the lift arm moves towards the rear of the machine, requiring the operator to move extremely close to or press up against the side of a tall container or other transport vehicle to get the bucket close enough to dump accurately. At the highest arm positions, the bucket may overflow the rear of the bucket to spill directly onto the top of the machine's cab. An extended reach design uses multiple hinges and parallel lifting bars on the boom lift arm, with the main pivot points towards the center or front of the machine. This allows the lift arm to have much greater operating height while retaining a compact design, and allows the vertical movement to be less of an arc and more straight-up vertical to keep the bucket forward of the operator's cab, allowing safe dumping into tall containers or vehicles. Typical manufacturers include Bobcat, Case, Caterpillar, Hyundai, John Deer, Komatsu and Kubota. The conventional bucket of many skid loaders can be replaced with a variety of specialized buckets or attachments, many powered by the loader's hydraulic system. These include backhoe, hydraulic breaker, pallet forks, angle broom, sweeper, auger, mower, snow blower, stump grinder, tree spade, trencher, dumping hopper, ripper, tillers, grapple, tilt, roller, snow blade, wheel saw, cement mixer, and wood chipper machines. The adaptability of a skid steer would be useful on a marsh buggy.

Summary of Selected Embodiment of the Invention

One embodiment of the invention includes a skid steer mounted on a marsh buggy. The skid steer includes adjustable length arms configured to place attached tools in front of the pontoons of the marsh buggy.

DETAILED DESCRIPTION OF THE PREFERRED EMBODIMENTS

Figure 6:
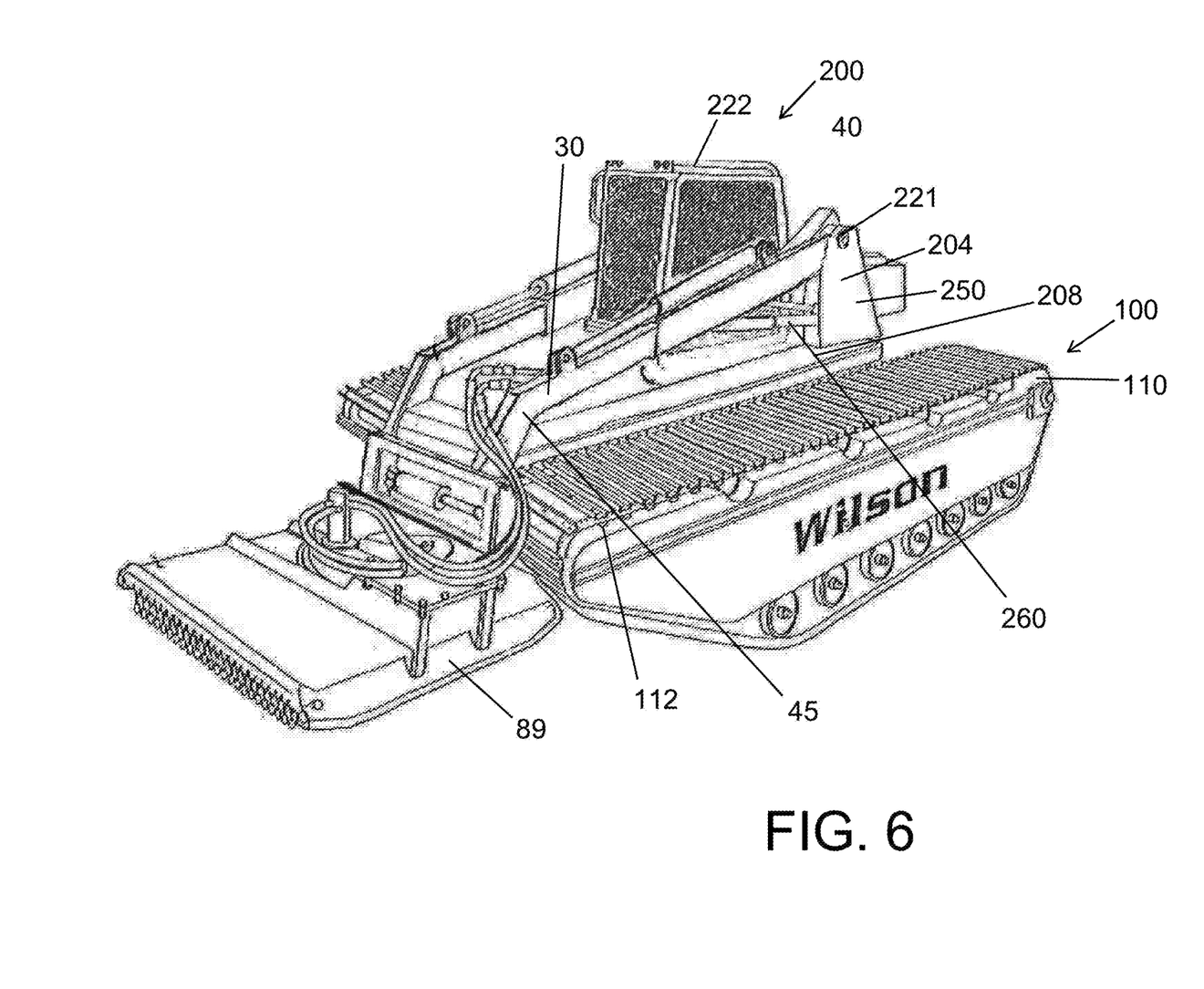
FIG. 6 is side prospective view of one embodiment of the combined marsh buggy and skid steer connected to a mower.

Referring now to FIG. 6, an exemplary embodiment of an amphibious vehicle is shown. The vehicle includes a traditional marsh buggy chassis 100, including two laterally opposed parallel pontoon systems 110, each being track driven with hydraulic drive systems located on each pontoon (not shown). The two pontoons 110 are connected, such as by a typical marsh buggy center platform work surface. Attached to the center platform (such as by bolting to the center platform) is a skid steer vehicle 200 (such as a Bobcat T630 or a Caterpillar 279D), preferably with the track (or wheeled) drive system removed. While the skid steer can be attached without removal of the drive system, it is more convenient to remove the drive system for re-routing of the hydraulic lines. The skid steer 200 hydraulic lines that control the skid steer drive system are connected to the drive systems of the marsh vehicle (e.g., motors in the pontoons), allowing control of the pontoon track drive systems to be operated from the controls mounted in the skid steer cab. This will generally require re-routing of four hydraulic lines. The typical hydraulic lines on the marsh buggy may be used.

Figures 8, 9:
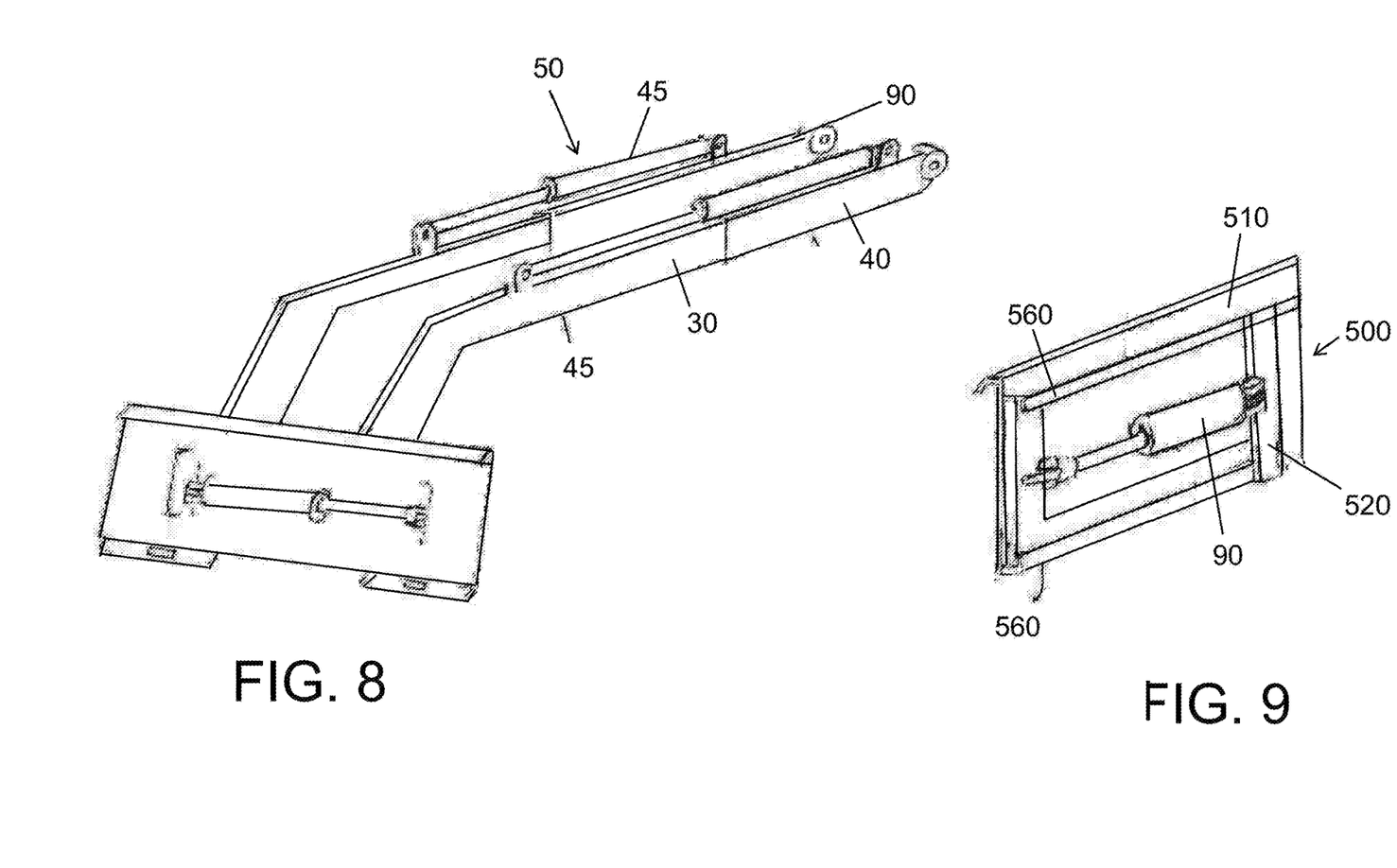
FIG. 8 is a detail of one embodiment of the extendable arm system seen in FIG. 6.
FIG. 9 is a detail of one embodiment of the slidable frame mounting plate.

The lift systems (e.g., booms 204) on the skid steer vehicle have to be modified to function on a marsh buggy, as the typical skid steer lift arms are not long enough to reach the front of a marsh buggy for functional use. As shown in FIG. 6, the pivotable booms have been modified to include a telescoping section that is expandable forwardly by including as part of the boom two arm sections 40 and 30 that are telescopically expandable by a hydraulic cylinder assembly 45. As shown in FIGS. 6 and 8, in a two arm embodiment, the rear arm 40 is pivotally mounted to the chassis and connected to the skid steer lifting system or mechanism 50. The front arm 30 is slidably coupled in a telescoping fashion to rear arm 40 with a hydraulic cylinder 45 operated by the controls in the cab. The hydraulic cylinder 45, mounted in-line with the two arms allows for modification of the length of the overall boom. The ability to extend the arms 30 allows the distal ends of the arms 30 to extend past the pontoons. As shown, the front arms 30 are in an "L" shaped configuration with the forward leg of the "L" being about 450 downwardly facing. This allows the ends of the front arms 30, including any attached devices (e.g., mower 89), to be positioned on or close to the ground. The distal or forward terminating ends of the front arms 30 are adapted to include standard skid steer connectors and adapters (not shown), including mounting plates, for the full range of skid steer attachments to be utilized. The two front arms 30 may be bridged together by fixed metal mounting plates to form a unitary front arm system. Auxiliary hydraulic lines may be included in the telescoping arms to provide control of and power to attached devices. As described in more detail below, the front arms 30 may include one or more hydraulic cylinders that attach to a front adaptor or mounting plate to allow for tilting of an attached device, such as a front loader or front scoop. All hydraulic cylinders and attached devices are controlled or operated from controls in the cab of the skid steer vehicle 200. The FIG. 6 embodiment also suggests how the lift system includes lifting hydraulic cylinders 260 extending between frame pillar 250 and rear arm 40.[1]

Figure 7:
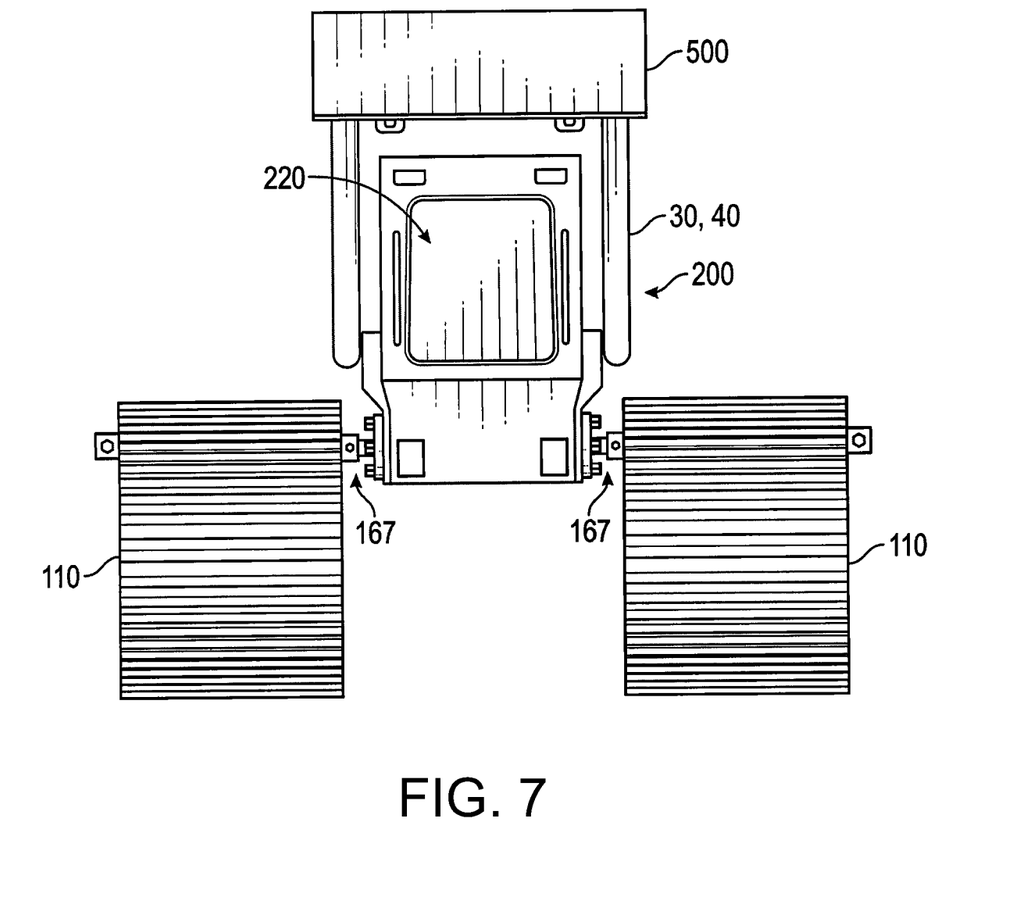
FIG. 7 is a front prospective view of the one embodiment of the combined marsh buggy and skid steer with the booms raised, and the booms connected to a slidable attachment of FIG. 9.

Shown in FIG. 7, is a front view of the combined skid steer and marsh buggy. The arms 30, 40 are raised with the ends of the arms coupled to the attachment device 500 of FIG. 9. In this embodiment, length-wise mounting flanges 167 are welded to each pontoon 110 on an interior face, and the skid steer is bolted to and supported by the flanges. In this embodiment, a separate center platform or beams are not needed to join the pontoons together, as the skid steer itself performs this function.

Shown in the FIG. 6 embodiment and detailed in FIG. 8, attached to the ends of the front lift arms 30 is a tool mounting plate 500, including first 510 and second 520 frame plates. The first frame plate 510 is attached between the two front arms 30, and the second frame plate 520 is slidably mounted to the first frame plate 510, such as on channels 560 positioned on first frame plate 510 (see FIG. 9). This configuration allows the second frame plate 520 to move sideways (i.e., lengthwise) on the first frame plate 510. A hydraulic frame cylinder 90 is attached between the first 510 and second 520 frame plates, allowing lateral positioning of the second frame plate 520 with respect to the first frame plate 510. For instance, if a hush hog or cutter head is attached to the second frame plate 520, the hush hog may be moved across the front of the marsh buggy/skid steer vehicle, allowing cutting in front of the buggy treads. Additionally, most skid steers include a "float mode" where the booms or lift arms "float," allowing an attached device, such as a cutter, to follow the contours of the ground.

The combination of a marsh buggy platform with a skid steer vehicle (suitably adapted), provides the flexibility of a skid steer vehicle to a marsh buggy. As disclosed, the combination can be achieved by attaching an existing skid steer vehicle to an existing marsh buggy platform, with modifications to the boom system of the skid steer vehicle and possibly to the marsh buggy, such as a mount system on the marsh buggy platform (e.g., welding attachment lugs for the skid steer). Alternatively, the combination can be achieved by building the combined flexibility directly in a special purpose vehicle, including the skid steer components combined with the marsh buggy platform.

The invention claimed is:

1. A marsh buggy—skid steer combination comprising:
   (a) a marsh buggy comprising first and second floatable pontoons coupled together, each pontoon including a track drive system having an endless track extending around a long dimension of the pontoon and at least one hydraulic motor driving the endless tracks;
   (b) a skid steer mounted on the marsh buggy between the two pontoons, the skid steer comprising (i) a frame and (ii) an operator's cab positioned on the frame;
   (c) a hydraulically driven lift system including two booms, each boom operated by at least one hydraulic cylinder assembly controllable from the operator's cab, wherein distal ends of the booms are configured to extend beyond a front end of the pontoons;
   (d) an engine;
   (e) a hydraulic system including a pump powered by the engine and a hydraulic tank;
   (f) hydraulic controls positioned in the cab and configured to selectively direct hydraulic fluid to (i) the at least one hydraulic motor of the track drive system and (ii) the hydraulic cylinders of the lift system.

2. The combination of claim 1, wherein each boom comprises a front and rear arm, the rear arm being pivotably mounted to the frame, the front arm being telescopically coupled to the rear arm such that the hydraulic cylinder assembly extends the front arm from the rear arm.

3. The combination of claim 1, wherein the engine and hydraulic system are positioned on the skid steer frame.

4. The combination of claim 1, wherein the first and second pontoons are coupled together by a center platform and the operator's cab is positioned on the center platform.

5. The combination of claim 1, wherein the endless track includes a chain and treads running on a series of sprockets powered by the hydraulic motor or the marsh buggy.

6. The combination of claim 2, wherein the front arm telescopically slides into the rear arm and the hydraulic cylinder is pinned between the front arm and rear arm.

7. The combination of claim 4, wherein a turntable is positioned on the center platform and the frame is positioned on the turn table to allow rotation of the frame relative to the center platform.

8. The combination of claim 1, further comprising a mounting plate attached to distal ends of the front arms, the mounting plate including first and second frame plates, with the second frame plate being slidably mounted on the first frame plate and controlled by a plate hydraulic cylinder.

9. The combination of claim 1, wherein the marsh buggy further comprises a center platform connecting the pontoons and the skid steer is mounted on the center platform.

10. The combination of claim 1, wherein the distal ends of the font arms are angled downward relative to proximate ends of the front arms which engage the rear arms.

11. A method of using a marsh buggy—skid steer combination, the combination comprising:
    (a) a marsh buggy comprising first and second floatable pontoons coupled together, each pontoon including a track drive system having an endless track extending around a long dimension of the pontoon and at least one hydraulic motor driving the endless tracks;
    (b) a skid steer mounted on the marsh buggy between the two pontoons, the skid steer comprising (i) a fame and (ii) an operator's cab positioned on the frame;
    (c) a hydraulically driven lift system including two booms, each boom comprising a front and rear arm, the rear arm being pivotably mounted to the frame, the front arm being telescopically coupled to the rear arm by a hydraulic cylinder controllable from the operator's cab, wherein distal ends of the front arms are configured to extend beyond a front end of the pontoons;
    (d) an engine;
    (e) a hydraulic system including a pump powered by the engine and a hydraulic tank;
    (f) hydraulic controls positioned in the cab and configured to selectively direct hydraulic fluid to
    (i) the at least one hydraulic motor of the track drive system and (ii) the hydraulic cylinders of the lift system;
    (g) a mounting plate attached to distal ends of the front arms, the mounting plate including first and second frame plates, with the second frame plate being slidably mounted on the first frame plate and controlled by a plate hydraulic cylinder; and
    (h) a mowing head attached to the second plate of the mounting plate;
    the method comprising the steps of (i) while moving the marsh buggy forward, (ii) operating the mowing head, and (iii) moving the mowing head left and right on the mounting plate.

12. A marsh buggy—skid steer combination comprising:
    (a) a marsh buggy comprising first and second floatable pontoons coupled together, each pontoon including (i) an endless track comprising a chain with treads coupled around a periphery of each pontoon, and (ii) a series of sprockets coupled to the chain on each pontoon, wherein each sprocket is connected to a hydraulic motor for driving the endless tracks;

(b) a skid steer mounted on the marsh buggy between the two pontoons, the skid steer comprising (i) a fame, (ii) an engine and a hydraulic system, including a pump and hydraulic tank, (iii) an operator's cab positioned on the frame, the operator's cab further comprising a set of hydraulic controls connectable to the hydraulic system for controlling the hydraulic motors of the endless tracks;

(c) a hydraulically driven lift system including two booms, each boom comprising a front and rear arm, the rear arm being pivotably mounted to the frame, the front arm being telescopically coupled to the rear arm by a hydraulic cylinder controllable from the operator's cab, wherein distal ends of the front arms are configured to extend beyond a front end of the pontoons; and (d) wherein the hydraulic motors of the marsh buggy are operationally coupled to the hydraulic system of the skid steer so that the hydraulic controls in the cab are operationally connected to the hydraulic motors of the marsh buggy to control the endless tracks thereof.

13. The combination of claim 12, further comprising a mounting plate attached to distal ends of the front arms, the mounting plate including first and second frame plates, with the second frame plate being slidably mounted on the first frame plate and controlled by a plate hydraulic cylinder.

14. The combination of claim 12, wherein the marsh buggy further comprises a center platform connecting the pontoons and the skid steer is mounted on the center platform.

15. The combination of claim 12, wherein the distal ends of the font arms are angled downward relative to proximate ends of the front arms which engage the rear arms.

* * * * *